United States Patent
Sitzler et al.

(10) Patent No.: US 9,790,866 B2
(45) Date of Patent: Oct. 17, 2017

(54) FUEL REMOVAL METHOD FOR AN INTERNAL COMBUSTION ENGINE

(71) Applicant: Dr. Ing. h.c. F. Porsche Aktiengesellschaft, Stuttgart (DE)

(72) Inventors: Markus Sitzler, Remseck (DE); Thomas Rauner, Blaubeuren (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 161 days.

(21) Appl. No.: 14/936,703

(22) Filed: Nov. 10, 2015

(65) Prior Publication Data

US 2016/0138487 A1 May 19, 2016

(30) Foreign Application Priority Data

Nov. 13, 2014 (DE) ........................ 10 2014 116 569

(51) Int. Cl.
*F02D 13/02* (2006.01)
*F02B 25/14* (2006.01)
*F02D 41/00* (2006.01)
*F01M 11/10* (2006.01)

(52) U.S. Cl.
CPC ........ *F02D 13/0261* (2013.01); *F02B 25/145* (2013.01); *F01M 2011/14* (2013.01); *F02D 2041/001* (2013.01); *F02D 2250/11* (2013.01); *Y02T 10/18* (2013.01)

(58) Field of Classification Search
CPC ............. F02D 13/0261; F02D 2250/11; F02D 2041/001; F02B 25/145; Y02T 10/18; F01M 2011/14
See application file for complete search history.

(56) References Cited

U.S. PATENT DOCUMENTS

| | | |
|---|---|---|
| 2005/0217252 A1 | 10/2005 | Sato et al. |
| 2014/0058647 A1 | 2/2014 | Haladyna et al. |
| 2014/0174408 A1 | 6/2014 | Pfeiffer |

FOREIGN PATENT DOCUMENTS

| | | |
|---|---|---|
| DE | 602005000084 T2 | 2/2007 |
| DE | 102013216215 A1 | 5/2014 |
| DE | 102012112794 A1 | 6/2014 |

*Primary Examiner* — Hung Q Nguyen
*Assistant Examiner* — Xiao Mo
(74) *Attorney, Agent, or Firm* — Leydig, Voit & Mayer, Ltd.

(57) ABSTRACT

A fuel removal method is for an internal combustion engine that has a closed- and open-loop control system and a lubricant circuit containing a lubricant. The closed- and open-loop control system has characteristic values for operation of the internal combustion engine. The method includes carrying out a load point shift starting from a first operating point of the internal combustion engine to a second operating point of the internal combustion engine with the aid of the closed- and open-loop control system. The load point shift is carried out when a fuel characteristic value, which characterizes a fuel quantity formed in the lubricant, is greater than or equal to a fuel threshold value. The second operating point having a second scavenging gradient which is greater than a first scavenging gradient of the first operating point.

10 Claims, No Drawings

FUEL REMOVAL METHOD FOR AN INTERNAL COMBUSTION ENGINE

CROSS REFERENCE TO RELATED APPLICATIONS

Priority is claimed to German Patent Application No. DE 10 2014 116 569.1, filed on Nov. 13, 2014, the entire disclosure of which is hereby incorporated by reference herein.

FIELD

The present invention relates to a fuel removal method for an internal combustion engine.

BACKGROUND

Internal combustion engines have a lubricant circuit for supplying lubricant to moving components of the internal combustion engine. The lubricant circuit is a circuit which is not completely sealed off from disturbances. Thus, fuel can enter the lubricant via combustion chambers of the internal combustion engine, for example.

The lubricant, generally a lubricating oil, flows through the lubricant circuit over a plurality of operating cycles of the internal combustion engine. During this process, there can be a change in the viscosity of the lubricant. The change in the viscosity has the effect that the lubricant no longer has its original loadbearing capacity, and the corresponding components are thus no longer supplied in the required way.

In addition to the usual aging of the lubricant owing to deposits, abrasion and/or the incorporation of soot, dilution of the lubricant, referred to below as dilution of the lubricating oil, can likewise lead to a change in viscosity. If there is dilution of the lubricating oil, this means that there are proportions of fuel in the lubricant which result in the change in viscosity of the lubricant. The viscosity of the oil is significant for the lubricating effect of the oil. If the viscosity of the oil falls too much, the required lubrication of the internal combustion engine can no longer be reliably guaranteed.

Dilution of the lubricant can have various causes, e.g. frequent cold starts and short journeys, insufficient mixture preparation, insufficient warm-up phases combined with start-stop operation or electric operation in the case of hybrid vehicles.

German Laid-Open Application DE 10 2013 216 215 A1 discloses a method for reducing dilution of the lubricating oil, wherein, in particular, the internal combustion engine is operated for a certain time in a mode in which an engine temperature exceeds a certain threshold temperature.

DE 60 2005 000 084 T2 discloses a control method for an exhaust gas purification system of an internal combustion engine which brings about regeneration of a diesel particulate filter while taking account of possible dilution of the oil. The regeneration of the diesel particulate filter is carried out substantially in the steady-state or stationary condition of a motor vehicle having the internal combustion engine.

German Laid-Open Application DE 10 2012 112 794 A1 discloses a method for an internal combustion engine for determining a proportion of fuel in the oil. If a certain proportion of fuel is detected in the lubricating oil, there is the possibility of providing a remedy in various ways that are proposed. This remedy can be to change the oil, for example. In the case of a hybrid drive for a motor vehicle, i.e. in the case of a combination of an electric motor with the internal combustion engine, it is possible not to switch off the internal combustion engine for a certain period of time. With the aid of the method proposed, the proportion of fuel in the lubricating oil can be determined The internal combustion engine is controlled in accordance with the proportion of fuel determined, wherein, apart from the possibilities already mentioned, changing the operating point by shifting the load point of the internal combustion engine to increase a coolant and/or oil temperature is also mentioned.

SUMMARY

In an embodiment, the present invention provides a fuel removal method for an internal combustion engine that has a closed- and open-loop control system and a lubricant circuit containing a lubricant. The closed- and open-loop control system has characteristic values for operation of the internal combustion engine. The method includes carrying out a load point shift starting from a first operating point of the internal combustion engine to a second operating point of the internal combustion engine with the aid of the closed- and open-loop control system. The load point shift is carried out when a fuel characteristic value, which characterizes a fuel quantity formed in the lubricant, is greater than or equal to a fuel threshold value. The second operating point having a second scavenging gradient which is greater than a first scavenging gradient of the first operating point.

DETAILED DESCRIPTION

The present invention will be described in even greater detail below. The invention is not limited to the exemplary embodiments. All features described herein can be used alone or combined in different combinations in embodiments of the invention. The features and advantages of various embodiments of the present invention will become apparent by reading the following detailed description.

An aspect of the present invention is to provide an improved fuel removal method for an internal combustion engine.

A fuel removal method according to an embodiment of the invention for an internal combustion engine, which has a closed- and open-loop control system having characteristic values of the internal combustion engine and a lubricant circuit containing a lubricant results in a load point shift starting from a first operating point of the internal combustion engine to a second operating point of the internal combustion engine with the aid of the closed- and open-loop control system. The load point shift takes place in accordance with a fuel threshold value and is carried out when a fuel characteristic value, which characterizes a fuel quantity formed in the lubricant, is greater than or equal to a fuel threshold value. The load point shift is chosen in such a way that the second operating point has a second scavenging gradient which is greater than a first scavenging gradient of the first operating point. This allows fuel removal from the lubricant to be achieved exclusively through appropriate operation of the internal combustion engine and thus without further components.

Inherent in every internal combustion engine is an "engine map", which contains load points as a function of an engine speed of the internal combustion engine. This engine map is referred to as a load-speed map, wherein the load indicates a torque, which is proportional to a mean pressure of the internal combustion engine. This engine map is limited in respect of a minimum speed and a maximum speed as well as a full load. That is to say that a map with a large number of operating points is set up between these three limiting criteria and between non-operation of the internal combustion engine, which is characterized by the fact that both the load and the speed of the internal combustion engine are zero.

Each load point has a certain cylinder pressure profile over an operating cycle of the internal combustion engine. This cylinder pressure profile comprises not only a "high-pressure segment" but also a "charge exchange segment". The high-pressure profile is formed in a time segment of the operating cycle which is characterized by a closed combustion chamber of the internal combustion engine. If the internal combustion engine is designed as a reciprocating piston engine, inlet and outlet valves are generally formed on an internal combustion engine cylinder head at least partially containing the combustion chamber, which valves open or close inlet or outlet flow ducts in the cylinder head.

The charge exchange segment extends over the period of time in the operating cycle which is characterized by the possibility of flow through the combustion chamber. That is to say that the inlet and/or the outlet ducts are open. In the case of the reciprocating-piston engine, the charge exchange segment begins with opening of the outlet valves and ends with closure of the inlet valves.

To potentially increase an efficiency of the internal combustion engine, the charge exchange segment has a time phase in which both the inlet valves and the outlet valves are open, resulting in "valve overlap".

Whereas, when only the outlet valves are opened, an exhaust gas in the combustion chamber of the internal combustion engine is expelled only through a stroke motion of a piston of the internal combustion engine, there is the possibility, during the time phase of the valve overlap, to use a fresh air quantity flowing into the combustion chamber via the inlet valves and to expel the exhaust gas in the combustion chamber by means of a volume displacement. This possibility is all the more effective, the greater is an inlet pressure prevailing at the inlet valve ports in comparison with an outlet pressure prevailing at outlet valve ports.

A difference between the inlet pressure and the outlet pressure is referred to as a scavenging gradient. This scavenging gradient can have a value which is greater than, equal to or less than zero. If the value is less than zero, there is the possibility, for example, of internal exhaust gas recirculation since exhaust gas can flow back into the combustion chamber from an outlet section owing to the negative scavenging gradient.

The effect of the scavenging gradient can be additionally improved if the scavenging gradient is formed at a low engine speed since, in the case of a low engine speed, an effective period of time, defined in seconds for example, of the valve overlap phase is greater than in the case of high engine speeds. At low engine speeds, the exhaust gas thus has a longer period of time to flow out of the combustion chamber. Thus, the exhaust gas can flow completely out of the combustion chamber, wherein, for improved complete scavenging of the combustion chamber, it is even possible for some of the fresh air flowing into the combustion chamber to flow back out via the outlet valves during the current operating stroke.

If, in accordance with the fuel removal method according to the invention, a load point shift from the first operating point, which has a first scavenging gradient, to a second operating point, which has a second scavenging gradient which has a value greater than a value of the first scavenging gradient, is then carried out, improved fuel removal from the lubricant present can be achieved.

If the second scavenging gradient is a positive scavenging gradient, there is the advantage that, depending on the value of the pressure gradient, it is possible to ensure that no fuel enters the lubricant by virtue of the complete scavenging of the combustion chamber, thereby reducing dilution of the oil over a complete cycle of the lubricant in the lubricant circuit. A complete cycle of the lubricant is intended to mean the period of time from one change of lubricant to a subsequent change of lubricant for the internal combustion engine.

In another embodiment of the method according to the invention, the load point shift leads to a second operating point, which is in a low to medium load range of the internal combustion engine. Normally, especially at load points in which the combustion air ratio 2, is in the superstoichiometric range, some of the fuel is not burnt but is deposited in the lubricant. These load points are in the upper load range in the engine map. In the medium load range, that is to say at medium torques, the combustion air ratio 2, is predominantly stoichiometric to substoichiometric. During operation in this range, dilution of the oil is thus advantageously reduced. This applies especially if the operating point is in the low load range of the internal combustion engine. Another exceptional advantage of the second operating point in the medium to low load range is that a positive scavenging gradient is formed, especially in low load ranges.

If the load point shift is carried out in accordance with predictive route data, there is the possibility of setting favorable operating points of the internal combustion engine in accordance with a route to be traveled, making it possible to implement fuel removal in a planned way. The predictive route data can be determined when operating a motor vehicle having the internal combustion engine with a navigation device, for example. By means of these determined predictive route data, it is possible to ascertain in which segments of the planned route the internal combustion engine should preferably be operated in the low medium load range or at low to medium speed. This can be determined in advance with the aid of the closed- and open-loop control system.

Settings of operating points with low loads or positive scavenging gradients are preferentially suitable in the case of predictive route data for the route which include operation of the motor vehicle with a predominantly constant speed and/or with speed limits.

Predictive route data which include travel on an expressway are particularly preferred since, in this case, the internal combustion engine can be operated at a medium load point at low to medium speeds.

In another embodiment of the fuel removal method according to the invention, the load point shift is carried out in accordance with consumption by the internal combustion engine. In general, the closed- and open-loop control system has a plurality of characteristic maps containing various engine characteristic quantities, such as a mean effective pressure pme or a fuel consumption bi. Thus, by means of the characteristic maps stored in the closed- and open-loop control system, it is possible to determine a second operating point, which, in addition to a second scavenging gradient, which is greater than the first scavenging gradient, also comprises a fuel consumption which is to be preferred and is the most favorable in comparison with other possible operating points. Favorable consumption is thereby achieved at the same time as a reduction in dilution of the oil.

Further advantages, features and details of the invention will become apparent from the following description of preferred illustrative embodiments. The features and combinations of features which are mentioned in the description above can be used not only in the respectively indicated combination but also in other combinations or in isolation without exceeding the scope of the invention.

In one illustrative embodiment, an internal combustion engine in the form of an 8-cylinder engine is indicated. The internal combustion engine has a lubricant circuit containing a lubricant in the form of lubricating oil. Moreover, a closed- and open-loop control system for setting engine operating data is assigned to the internal combustion engine. The closed- and open-loop control system has various characteristic maps, in which engine characteristic data or characteristic values are stored with various relationships of dependency on one another. Thus, for example, fuel quantities mb to be injected are stored as a function of boost pressures p2 and engine speeds nmot in one of the characteristic maps. Exhaust gas back pressures p3 are likewise stored in one of the characteristic maps. These boost pressures p2 and exhaust gas back pressures p3 are each assigned corresponding mean pressure values pm and/or engine speeds nmot or vice versa. It is thus possible to determine which boost pressure p2 and which exhaust gas back pressure p3 is present in the case of a current operating point, subsequently the first operating point. From this, it is likewise possible to determine a scavenging gradient pS as pS=p2−p3. Likewise, it is also possible for the scavenging gradient pS to be stored in a characteristic map.

A fuel threshold value, which indicates a value corresponding to a certain fuel quantity formed in the lubricating oil is furthermore stored, preferably in the closed- and open-loop control system. This fuel threshold value can indicate the fuel quantity directly, for example. However, it is likewise also possible for a corresponding parameter for the fuel threshold value to be stored, e.g. a value for the ratio of the fuel quantity to the quantity of lubricating oil.

The fuel quantity formed in the lubricant at the time of the first operating point, i.e. the fuel quantity currently formed, can be determined by means of different methods and/or characteristic maps, wherein these methods can also include pre-calculation, and it is stored as a fuel characteristic value, preferably in the closed- and open-loop control system. According to the invention, a first scavenging gradient of the first operating point is determined as soon as this fuel characteristic value is equal to or greater than the fuel threshold value. Starting from this first scavenging gradient, a second scavenging gradient, which is greater than the first scavenging gradient, is determined in the characteristic map. Starting from this first operating point, a load point shift then takes place to a second operating point, which has the second scavenging gradient.

In another illustrative embodiment, the closed- and open-loop control system is connected electronically for data transmission to a system which determines predictive route data, in the form of a navigation system. By virtue of the data transmission between the two systems, it is possible to operate the internal combustion engine on the basis of the predictive route data. In other words, it is possible, given a correspondingly determined route, to select operating points with positive scavenging gradients, with which fuel removal can be achieved.

This allows the internal combustion engine to have an extended lubricant change cycle, in other words oil change cycle.

This also allows the internal combustion engine to be operated in a reduced-fuel and thus reduced-emission operating range in a controlled way.

In another illustrative embodiment, the internal combustion engine is connected to an electric motor. When the internal combustion engine is coupled to the electric motor, forming what is referred to as a hybrid engine, on routes on which the operating points with low loads could be implemented, the motor vehicle is normally driven by the electric motor. The internal combustion engine is usually provided preferentially as the drive when operating on rural highways and/or expressways. That is to say that fuel removal is not normally envisaged in the case of a hybrid engine.

The internal combustion engine having the fuel removal method according to embodiments of the invention is particularly suitable for operation of the hybrid engine. The advantage is that the internal combustion engine can be operated with low loads in selected ranges, e.g. during travel on an expressway, whereas the electric motor comes into use on selected routes, e.g. in town traffic.

While the invention has been described in detail in the foregoing description, such description is to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A fuel removal method for an internal combustion engine, the internal combustion engine having a closed- and open-loop control system and a lubricant circuit containing a lubricant, where the closed- and open-loop control system has characteristic values for operation of the internal combustion engine, the method comprising:
   carrying out a load point shift starting from a first operating point of the internal combustion engine to a second operating point of the internal combustion engine with the aid of the closed- and open-loop control system, the load point shift being carried out when a fuel characteristic value, which characterizes a fuel quantity formed in the lubricant, is greater than or equal to a fuel threshold value, the second operating point having a second scavenging gradient which is greater than a first scavenging gradient of the first operating point.

2. The fuel removal method as recited in claim 1, wherein the second scavenging gradient is a positive scavenging gradient.

3. The fuel removal method as recited in claim 1, wherein the second operating point is in a low to medium load range of an operating characteristic map of the internal combustion engine.

4. The fuel removal method as recited in claim 2, wherein the second operating point is in a low to medium load range of an operating characteristic map of the internal combustion engine.

5. The fuel removal method as recited in claim 3, wherein the second operating point is in the low load range and low speed range of the operating characteristic map of the internal combustion engine.

6. The fuel removal method as recited in claim 4, wherein the second operating point is in the low load range and low speed range of the operating characteristic map of the internal combustion engine.

7. The fuel removal method as recited in one of claim 1, wherein the load point shift is carried out in accordance with predictive route data.

8. The fuel removal method as recited in claim 7, wherein the predictive route data comprises a route with at least one of a predominantly constant speed or speed limits.

9. The fuel removal method as recited in claim 8, wherein the predictive route data include travel on an expressway.

10. The fuel removal method as claimed in claim 1, wherein the load point shift is carried out in accordance with consumption by the internal combustion engine.

\* \* \* \* \*